United States Patent
Tsai et al.

(10) Patent No.: US 6,836,829 B2
(45) Date of Patent: Dec. 28, 2004

(54) PERIPHERAL DEVICE INTERFACE CHIP CACHE AND DATA SYNCHRONIZATION METHOD

(75) Inventors: Chau-Chad Tsai, Taipei (TW); Chi-Che Tsai, Kaohsiung Hsien (TW); Chen-Ping Yang, Taipei (TW)

(73) Assignee: VIA Technologies, Inc., Taipei Hsien (TW)

( * ) Notice: Subject to any disclaimer, the term of this patent is extended or adjusted under 35 U.S.C. 154(b) by 171 days.

(21) Appl. No.: 09/853,005

(22) Filed: May 9, 2001

(65) Prior Publication Data

US 2001/0032295 A1 Oct. 18, 2001

(30) Foreign Application Priority Data

Nov. 20, 1998 (TW) ........................................ 87119245 A
Jun. 16, 2000 (TW) ........................................ 89111825 A

(51) Int. Cl.$^7$ .............................................. G06F 12/00
(52) U.S. Cl. ...................... 711/141; 711/118; 711/144; 711/145; 711/146
(58) Field of Search .................................. 711/118, 141, 711/144, 145, 146

(56) References Cited

U.S. PATENT DOCUMENTS 6,032,228 A * 2/2000 Islam et al. ................. 711/144
6,182,176 B1 * 1/2001 Ziegler et al. .............. 710/112

OTHER PUBLICATIONS

IBM TDB "Integrated Concurrency and Shared Buffer Coherency Controls for Multi–Systems", Mar. 1, 1996 vol. 28 Issue 10 pp. 4642–4650.*

Dan et al. "Performance Analysis of Buffer Coherency Policies in a Multisystem Data Sharing Environment", IEEE Trans. on Parrallel and Distributed Systems vol. 4, No. 3, Mar. 1993.*

IBM TDB "Hybrid Buffer Coherency Control Scheme", Sep. 1, 1991, vol. 34 Issue 4B pp. 182–184.*

Handy, "The Cache Memory Book", $2^{nd}$ Edition Academic Press 1998, p. 47–49, 165–169.*

Definition for the word "cache" obtained from http://www-.dictionary.com $3^{rd}$ source $3^{rd}$ definition.*

* cited by examiner

Primary Examiner—Mano Padmanabhan
Assistant Examiner—Paul Baker
(74) Attorney, Agent, or Firm—J.C. Patents

(57) ABSTRACT

A peripheral device interface control chip having a cache system therein and a method of synchronization data transmission between the cache system and an external device in a computer system. The cache system and data synchronization method can be applied to the peripheral device interface control chip having a data buffer and a peripheral device interface controller. The data buffer is located inside the control chip for holding data stream read from a memory unit so that data required by the peripheral device is provided. When the data stream is still valid, the data stream is retained. The peripheral device interface controller is installed inside the control chip. The peripheral device interface controller detects if the data stream inside the data buffer includes the data required by the peripheral device and whether the data stream is still valid or not. The peripheral device interface controller also controls the placement of the data stream retrieved from the memory into the data buffer and state transition of the data buffer.

6 Claims, 3 Drawing Sheets

PERIPHERAL DEVICE INTERFACE CHIP CACHE AND DATA SYNCHRONIZATION METHOD

CROSS-REFERENCE TO RELATED APPLICATION

This application claims the priority benefit of Taiwan application serial No. 89111825, filed Jun. 16, 2000, and Taiwan application serial No. 87119245, filed Nov. 20, 1998.

BACKGROUND OF THE INVENTION

1. Field of Invention

The present invention relates to a cache system and a method of synchronization data transmission. More particularly, the present invention relates to a cache system in a peripheral device interface control chip cache for synchronization data communication.

2. Description of Related Art

Although data buffers are frequently employed inside a peripheral device interface control chip to process read-out data, cache memory functions are mostly absent. Therefore, whenever peripheral devices need to recall data from a memory unit, the peripheral device interface control chipset must execute a read command and retrieve the relevant data from the memory unit.

FIG. 1 is a conventional timing diagram showing a portion of the peripheral device bus signals during a session when data is read from an external device to a peripheral device. As shown in FIG. 1, two batches of data are transmitted through the peripheral device bus. The two batches of data are transmitted starting at clock cycle CLK1 and CLK20 respectively.

Starting at clock cycle CLK1, a FRAME signal is activated to indicate the initialization of data transmission. In the meantime, destination address of the target device for receiving the transmission data is put on the AD signal lines of bus. In clock cycle CLK2, an IRDY signal is activated to indicate readiness of transmission data of the peripheral device. However, the target is not yet ready to receive the transmission data and the transmission has to wait until the target ready signal TRDY arrives at clock cycle CLK8. Therefore, actual transmission is carried out only at the start of clock cycle CLK9. The period starting from the activation of the IRDY signal to the point just before the activation of the TRDY signal is known as a latency period.

In FIG. 1, the transmission of the second batch of data starts at clock cycle CLK20 when a FRAME signal is activated. The second batch of data is similar to the first batch of data or differs from the first batch by a single line. In other words, the second batch of data may be within a 32-byte address. Hence, control and signal timing of the signal bus by the peripheral device interface controller is similar to the transmission of the first batch of data.

Starting at clock cycle CLK20, a FRAME signal is activated to indicate the initialization of data transmission. In the meantime, destination address of the target device for receiving the transmission data is put on the AD signal lines of the bus. In clock cycle CLK21, an IRDY signal is activated to indicate readiness of transmission data of the peripheral device. However, the target is not yet ready to receive the transmission data and the transmission has to wait until the target ready signal TRDY arrives at clock cycle CLK27. Therefore, actual transmission is carried out only at the start of clock cycle CLK28.

In brief, in conventional data transmission between two peripheral devices through an interface, although two consecutive batches of data have the same target address or differ just by a single line, a latency period is created in each transmission period. The extra latency period will lead to a slow down of the peripheral device interface and a reduction in the efficiency of peripheral device bus and peripheral device.

SUMMARY OF THE INVENTION

Accordingly, one object of the present invention is to provide a peripheral device interface control chip having a cache system therein for synchronization data communication with external devices. The cache system inside the control chip is capable of reducing latency period when data are read by a peripheral device, so that utilization of the peripheral device and the peripheral device bus is increased. Furthermore, correctness of transmitted data is further ensured through a data synchronization method.

To achieve these and other advantages and in accordance with the purpose of the invention, as embodied and broadly described herein, the invention provides a peripheral device interface control chip having a cache system in a computer system. The computer system includes a set of memory units, a central processing unit (CPU), a CPU bus, a peripheral device bus and at least one peripheral device. The cache system includes a data buffer and a peripheral device interface controller. The data buffer is located within the control chip for holding a data stream read from the memory so that data required by the peripheral device are provided. In addition, if the data stream is synchronous to the data in the corresponding address within the memory, the data stream is retained. When any one of the peripheral devices demands data already in the data stream, data within the data stream can be immediately provided by the data bufferso that latent period for retrieving the data stream from memory again is reduced.

The peripheral device controller is also installed within the control chip. The controller is used for determining if the data stream includes data demanded by a particular peripheral device, determining if the data stream is synchronous to the data in the corresponding address, retrieving the data stream from memory and putting the data in a data buffer, and switching the state of that portion of the data buffer having data stream therein.

This invention also provides a method of synchronization data transmission between a cache inside a peripheral device interface control chip and an external device. The method can be applied to a computer system having a set of memory unit, at least one central processing unit, a control chip, a peripheral device bus, a CPU bus and at least one peripheral device. The control chip includes a peripheral device interface controller and a data buffer. Furthermore, when data stream within memory is read into the data buffer, the data stream becomes a buffer data stream.

The data synchronization method includes the following steps. On initialization, the data buffer is set to an empty state. When the peripheral device interface controller reads a buffer data stream into the data buffer according to the requirement of a particular peripheral device, the buffered data portion of the data buffer that includes the buffer data stream is set to a clean-unaccessed state. If the peripheral device interface controller detects from the CPU bus a write or a read operation using the corresponding address when the said buffered data portion is in a clean-unaccessed state, the buffered data portion is set to a dirty-unaccessed state.

In addition, If the peripheral device interface controller detects from the peripheral device bus a write operation using the corresponding address when the buffered data is in the clean-unaccessed state, the buffered data portion is set to a dirty-unaccessed state.

If the particular peripheral device that demands the buffer data stream reads the buffer data stream from the buffered data portion when the buffered data portion is in the clean-unaccessed state, the buffered data portion is set to a clean-accessed state.

If the particular peripheral device that demands the buffer data stream reads the buffer data stream from the buffered data portion when the buffered data portion is in a dirty-unaccessed state, the buffered data portion is set to an empty state.

Furthermore, if the peripheral device interface controller detects from the CPU bus a read or a write operation using the corresponding address when the buffered data portion is in a clean-accessed state, the buffered data portion is set to an empty state.

If the peripheral device interface controller detects from the peripheral device bus a write operation using the corresponding address when the buffered data portion is in the clean-accessed state, the buffered data portion is set to an empty state.

This invention also provides a peripheral device interface control chip having a cache system therein and a method of synchronization in data transmission with external devices. The method can be applied to a computer system having a set of memory unit, at least one central processing unit, a control chip, a peripheral device bus, a CPU bus and at least one peripheral device. The control chip includes a peripheral device interface controller and a data buffer. The central processing unit uses a MOESI protocol. Documents relating to the techniques and theories behind the operation of MOESI protocol can be found by contacting the following Internet address: "http://www.sun.com/microelectronics/datasheets/stp1030/10.html". When memory data stream within the memory is read into the central processing unit, the memory data stream becomes a cache data stream. On the other hand, when memory data stream is read into the buffer data, the data stream becomes a buffer data stream.

The data synchronization method includes the following steps. First, if the data buffer executes a read operation from an address in memory that corresponds to the cache data stream when the cache data stream is in modified state, then the peripheral device interface controller will inform the central processing unit to set the cache data stream into an owner state.

If the data buffer executes a read operation from the corresponding address when the cache data stream is in an exclusive state, the peripheral device interface controller will inform the central processing unit to set the cache data stream into a shared state.

In brief, this invention utilizes the data buffer inside a control chip to store read-out data as well as other data in neighboring addresses so that latency period of reading data by peripheral devices is greatly reduced. Hence, utilization of peripheral devices and peripheral device bus is increased correspondingly. Furthermore, by using a data synchronization method, correctness of transmitted data is ensured.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
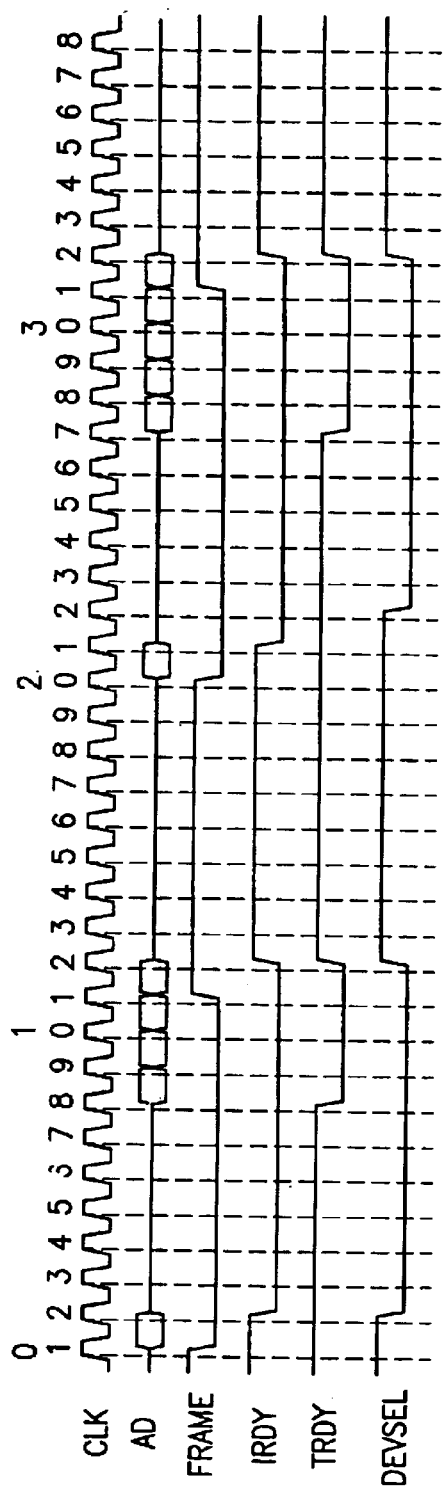
FIG. 1 is a conventional timing diagram showing a portion of the bus signals during a session when two batches of data are read from memory to a peripheral device.

Reference will now be made in detail to the present preferred embodiments of the invention, examples of which are illustrated in the accompanying drawings. Wherever possible, the same reference numbers are used in the drawings and the description to refer to the same or like parts.

The invention also allows a CPU interface to control the writing process, including receiving a write request and data from a CPU and then writing the data to a memory of a memory circuit. After the CPU interface receives a write request from the CPU, the CPU interface sends a dummy request to the memory control circuit to pre-charge and activate the designative memory page of the memory circuit before the data is sent to the memory circuit. Since the designative memory page is always pre-charged and activated while the data is received at the memory control circuit, the memory control circuit sends only a write commands to the memory for writing the data to the memory without further pre-charging and activating the designative memory page. Therefore, the total number of clock cycles required for processing a write request is shortened.

Figure 2:
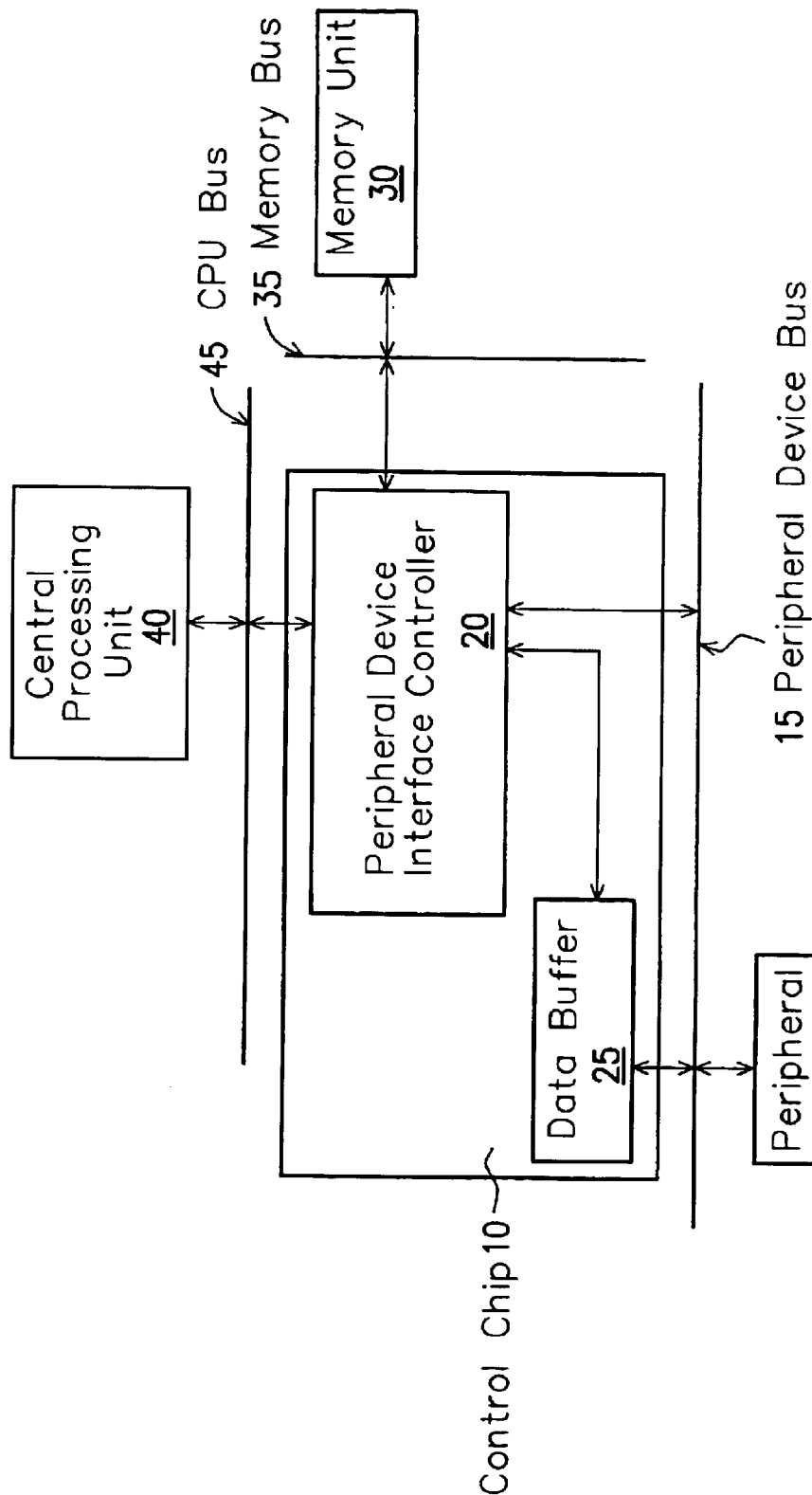
FIG. 2 is a block diagram showing the connections between different modules in a computer system according to one preferred embodiment of this invention.

FIG. 2 is a block diagram showing the connections between different modules in a computer system according to one preferred embodiment of this invention. As shown in FIG. 2, the computer system includes a memory unit 30, a control chip 10, a peripheral device 50, a central processing unit (CPU) 40, a peripheral device bus 15, a CPU bus 45, a memory bus 35, a peripheral device interface controller 20 and a data buffer 25.

The data buffer 25 is installed within control chip 10 for holding data stream read from memory unit 30 so that data needed by peripheral device 50 are provided. Peripheral device interface controller 20 is also installed inside control chip 10 for detecting if the data stream within the data buffer 25 contains the data demanded by the peripheral device 50. In addition, peripheral device interface controller 20 also detects among the peripheral device bus 15 and the CPU bus 45 any action of the data on the corresponding address of the memory unit 30 to judge if the data stream is still valid or not. Peripheral device interface controller 20 will retain the data stream until other data stream needs to use this portion of area or the data stream is already not in synchrony with the correct data.

Furthermore, peripheral device interface controller 20 is capable of retrieving a data stream from memory unit 30 according to a demand from peripheral device 50 and putting the data stream in data buffer 25. In the meantime, peripheral device interface controller 20 will issue a probe-hit-read signal to the central processing unit 40. Moreover, the aforementioned act of detecting action in corresponding address also includes accepting signals produced by peripheral device bus 15 during an operation of writing data to the corresponding address, accepting signals produced by CPU bus 45 during a write operation and accepting signals produced by CPU bus 45 during a read operation. In addition, peripheral device interface controller 20 also controls state transition in the data buffer 25 according to the result of detection.

In this embodiment, data buffer 25 includes eight lines with each line having a holding capacity of 32 bytes. Hence, overall holding capacity of data buffer 25 is 256 bytes. In addition, every two lines are grouped together as a transmission block with each transmission block holding the data in a data read transmission. Since two lines are used to form a transmission block, the next batch of data is also read out besides the batch of data demanded by the peripheral device 50. In other words, altogether 64 bytes are read out.

Figure 3:
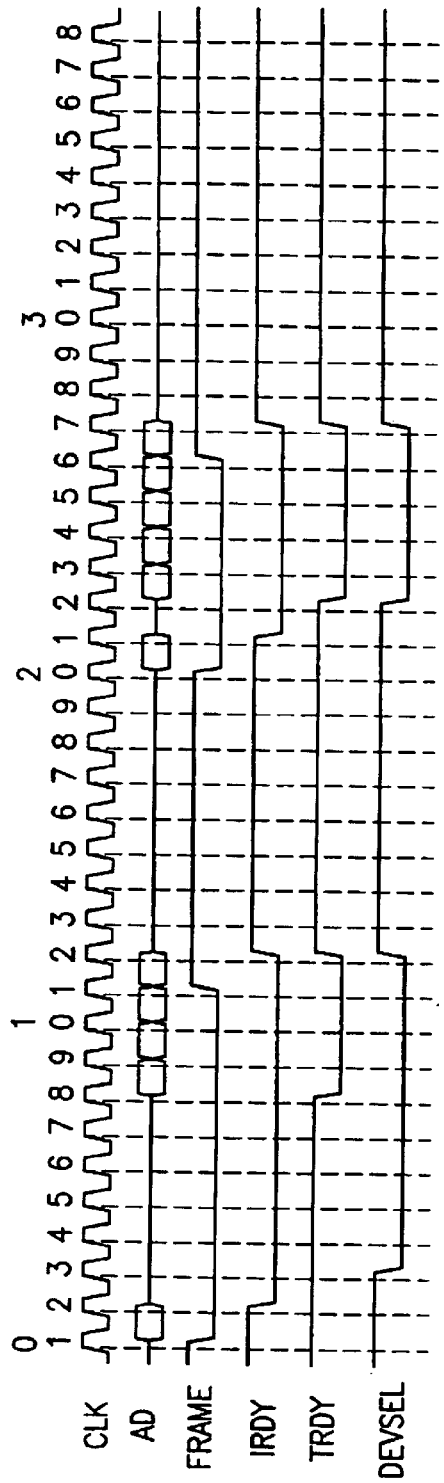
FIG. 3 is a timing diagram showing a portion of the bus signals during a session when two batches of data are read from memory to a peripheral device according to this invention.

FIG. 3 is a timing diagram showing a portion of the bus signals during a session when two batches of data are read from memory to a peripheral device according to this invention. As shown in FIG. 1 and FIG. 3, the clocking pulse for reading the first batch of data are identical. However, after reading the first batch of data, the peripheral device interface controller 20 reads in 64 bytes of data that also includes the first batch of data. All these data are stored in a transmission block within the data buffer 25. Hence, when the peripheral device 50 needs to read the second batch of data and if the address of the second batch of data is identical to the first batch or the address is within the same 64-byte transmission block, latency of the second data read is only from clock cycle CLK21 to CLK22 as shown in FIG. 3. In other words, the system has a latency period of only one clock cycle instead of six clock cycles in a conventional system. Therefore, the system of this invention is capable of increasing peripheral device interface transmission rate considerably.

Figure 4:
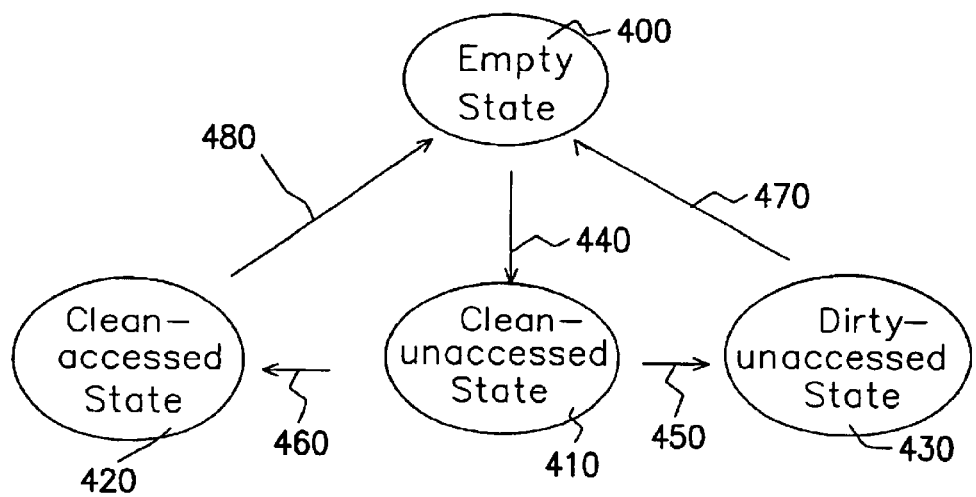
FIG. 4 is a state transition diagram showing data transition between different states inside a data buffer according to this invention.

FIG. 4 is a state transition diagram showing data transition between different states inside a data buffer 25 according to this invention. Data within the data buffer 25 can be in one of four states, including: an empty state 400, a clean-unaccessed state 410, a dirty-unaccessed state 430 and a clean-accessed state 420.

Any one of the memory data streams in memory 30 read out by central processing unit 40 forms a cache data stream. The memory data stream is stored in data buffer 25 to form a buffer data stream. The memory data stream, the cache data stream and the buffer data stream all correspond to the same address in memory unit 30.

The data synchronization method includes the following steps. On initialization, data buffer 25 is set to an empty state 400. When peripheral device interface controller 20 reads a memory data stream from memory 30 into data buffer 25 according to the requirement of a particular peripheral device 50, the portion of data buffer 25 that stores the memory data stream, or in other words, the buffered data portion of the data buffer 25 that stores the buffer data stream is set to a clean-unaccessed state 410 via process 440.

When the said buffered data portion is in a clean-unaccessed state 410 and if peripheral device interface controller 20 detects from CPU bus 45 a write or a read operation using the corresponding address, or, if peripheral device interface controller 20 detects from peripheral device bus 15 a write operation using the corresponding address, the buffered data portion is set to a dirty-unaccessed state 430 via process 450.

When the buffered data portion is in a clean-unaccessed state 410 and if the particular peripheral device 50 that demands the buffer data stream reads the buffer data stream from data buffer 25, the buffered data portion is set by peripheral device interface controller 20 to a clean-accessed state 420 via process 460.

When the buffered data portion is in a dirty-unaccessed state 430 and if the particular peripheral device 50 that demands the buffer data stream reads the buffer data stream from the data buffer 25, the buffered data portion is set to an empty state 400 via process 470.

Furthermore, when the buffered data portion is in a clean-accessed state 420 and if peripheral device interface controller 20 detects from CPU bus 45 a read or a write operation using the corresponding address, or, if peripheral device interface controller 20 detects from peripheral device bus 15 a write operation using the corresponding address, the buffered data portion is set to an empty state 400 via process 480.

Figure 5:
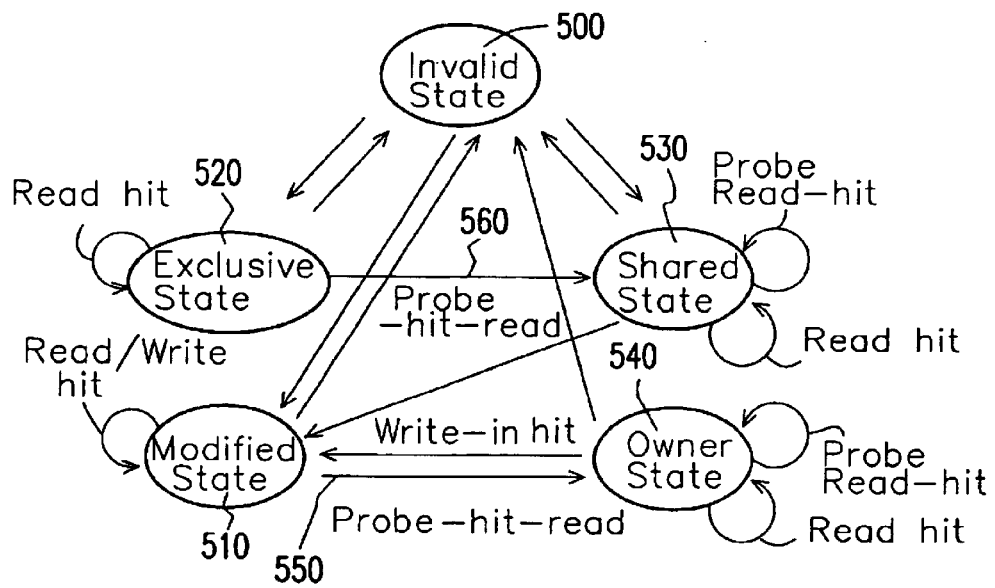
FIG. 5 is a state transition diagram showing the transition of states for the data in a central processing unit operating under a MOESI protocol according to this invention.

FIG. 5 is a state transition diagram showing the transition of states for the data in the cache memory of a central processing unit operating under a MOESI protocol according to this invention. As shown in FIG. 5, the MOESI protocol includes five states including: a modified state (M) 510, an owner state (O) 540, an exclusive state (E) 520, a shared state (S) 530 and an invalid state (I) 500. The MOESI protocol is a means of maintaining uniformity in data transmission between the cache memory inside a central processing unit and any external cache memory unit.

When the cache memory is in an invalid state 500 and if data is read from the memory unit and the data is not present in other cache memory, the cache memory will transit from invalid state 500 to an exclusive state 520 (an I–E conversion). If data read from the memory unit is present in other cache memory, the cache memory will transit from invalid state 500 to a shared state 530 (an I–S conversion). If the cache memory generates a write miss signal, data will automatically read from the memory unit and the cache memory will transit from invalid state 500 to a modified state 510 (an I–M conversion).

If the cache memory inside the central processing unit is in the exclusive state 520 and the cache memory needs to modify the data, the cache memory will transit from the exclusive state 520 to a modified state 510 (an E–M conversion). If system demands the data in the exclusive state 520, the data will transit from the exclusive state 520 to a shared state 530 (an E–S conversion). If the data need to be cleared or other data need to be stored in the storage area, the data will transit from the exclusive state 520 to an invalid state 500 (an E–I conversion).

Furthermore, if the cache memory inside the central processing unit is in a shared state 530 and data need to be stored, the cache memory will transit from the shared state 530 to a modified state 510 (a S–M conversion). If data need to be cleared for storing other data, or if copies of the data in other cache memory need to be modified, the data will transit from the shared state 530 to an invalid state 500 (a S–I conversion).

When the cache memory inside the central processing unit is in a modified state 510 and if other cache memory issues a read signal for reading data from the internal cache memory, the data will transit from the modified state 510 to an owner state 540 (a M–O conversion). On the other hand, if data need to be cleared for the storage of other data or other cache memory needs to write the data, the data will transit from the modified state 510 to an invalid state 500 (an M–I conversion). In addition, if other cache memory needs to read the data, the data will transit from the modified state 510 into a shared state 530 (an M–S conversion).

Finally, if the cache memory inside the central processing unit is in the owner state 540 and if the data need to be written in, the data will transit from the owner state 540 into a modified state 510 (an O–M conversion).

The following is a description of probe-hit-read signal emitted by the peripheral device interface controller. The probe-hit-read signal is transmitted to the central processing unit when data are read from the memory unit to the data buffer. The probe-hit-read signal further includes the corresponding address for proper reading of data from the memory unit to the data buffer.

FIGS. 2, 4, and 5 together also illustrate another preferred embodiment of this invention. If the central processing unit operates using the said MOESI protocol and if the data within the cache memory are in an exclusive state 520, when a probe-hit-read signal sent from the peripheral device interface controller arrives, and if the address included within the probe-hit-read signal is identical to the address of the data inside the cache memory, the data within the cache memory of the central processing unit will transit from the exclusive state 520 to a shared state 530 via an E–S conversion process 560.

Furthermore, if the central processing unit operates using the said MOESI protocol and if the data within the cache memory are in a modified state 510, and if the address included within the probe-hit-read signal is identical to the address of the data inside the cache memory, the data within the cache memory of the central processing unit will transit from the modified state 510 to an owner state 540 via a M–O conversion process 550.

In summary, the incorporation of a data buffer in the northbridge chipset of this invention is able to reduce latency period when data are read from a memory unit to a peripheral device. Hence, the utilization of both the peripheral device and the peripheral device bus is increased. Furthermore, data integrity is ensured through a data synchronization scheme.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of synchronization data transmission between cache memory inside a peripheral device interface control chip and external device that can be applied to a computer system having a memory unit, at least one central processing unit, a control chip, a peripheral device bus, a CPU bus and at least one peripheral device, wherein the control chip includes a peripheral device interface controller and a data buffer and the central processing unit uses a MOESI protocol, a memory data stream becomes a cache data stream when the memory data stream within the memory is read into the central processing unit, and the memory data stream becomes a buffer data stream when the memory data stream is read into the data buffer, further comprising the steps wherein:

when the cache data stream is in a modified state and if the data buffer executes a read operation from an address in memory that corresponds to the cache data stream, the peripheral device interface controller inform the central processing unit to set the cache data stream into an owner state; and when the cache data stream is in an exclusive state and if the data buffer executes a read operation from the corresponding address, the peripheral device interface controller will inform the central processing unit to set the cache data stream into a shared state, wherein the data buffer is set to an empty state on initialization;

when the peripheral device interface controller reads the buffer data stream into the data buffer according to the requirement of the particular peripheral device, a buffered data portion of the data buffer that includes the buffer data stream is set to a clean-unaccessed state;

when the buffered data portion is in a clean-unaccessed state and if the peripheral device interface controller detects from the CPU bus a write or a read operation using the corresponding address, the buffered data portion is set to a dirty-unaccessed state;

when the buffered data portion is in the clean-unaccessed state, if the peripheral device interface controller detects from the peripheral device bus a write operation using the corresponding address, the buffered data portion is set to a dirty-unaccessed state;

when the buffered data portion is in the clean-unaccessed state and if the particular peripheral device that demands the buffer data stream reads the buffer data stream from the buffered data portion, the buffered data portion is set to a clean-accessed state;

when the buffered data portion is in a dirty-unaccessed state and if the particular peripheral device that demands the buffer data stream reads the buffer data stream from the buffered data portion, the buffered data portion is set to an empty state;

when the buffered data portion is in a clean-accessed state and if the peripheral device interface controller detects from the CPU bus a read or a write operation using the corresponding address, the buffered data portion is set to an empty state; and when the buffered data portion is in the clean-accessed state and if the peripheral device interface controller detects from the peripheral device bus a write operation using the corresponding address, the buffered data portion is set to an empty state.

2. The data synchronization method of claim 1, wherein a probe-hit-read signal is transmitted from the peripheral device interface controller to the central processing unit when a buffer data stream is read from the peripheral device interface controller to the data buffer.

3. The data synchronization method of claim 2, wherein the probe-hit-read signal further includes the corresponding addresses.

4. A method of synchronization data transmission between cache memory inside a peripheral device interface chip and external device that can be applied to a computer system having a memory unit, at least one central processing unit, a control chip, a peripheral device bus, a CPU bus and at least one peripheral device, wherein the control chip includes a peripheral device interface controller and a data buffer, and a data stream becomes a buffer data stream when the memory data stream inside the memory is read into the buffer data, comprising the steps of:

setting the data buffer to an empty state on initialization;

settting the buffered data portion of the data buffer that includes the buffer data stream to a clean-unaccessed state when the peripheral device interface controller reads the buffer data stream into the data buffer according to the requirement of the particular peripheral device;

setting the buffered data portion to a dirty-unaccessed state if the peripheral device interface controller detects from the CPU bus a write or a read operation using the corresponding address when the buffered data portion is in a clean-unaccessed state;

setting the buffered data portion to a dirty-unaccessed state if the peripheral device interface controller detects from the peripheral device bus a write operation using the corresponding address when the buffered data portion is in the clean-unaccessed state;

setting the buffered data portion to a clean-accessed state if the particular peripheral device that demands the buffer data stream, reads the buffer data stream from the buffered data portion when the buffered data portion is in the clean-unaccessed state;

setting the buffered data portion to an empty state if the particular peripheral device that demands the buffer data stream, reads the buffer data stream from the buffered data portion when the buffered data portion is in a dirty-unaccessed state;

setting the buffered data portion to an empty state if the peripheral device interface controller detects from the CPU bus a read or a write operation using the corresponding address when the buffered data portion is in a clean-accessed state; and setting the buffered data portion to an empty state if the peripheral device interface controller detects from the peripheral device bus a write operation using the corresponding address when the buffered data portion is in the clean-accessed state.

5. The data synchronization method of claim 4, wherein a probe-hit-read signal is transmitted from the peripheral device interface controller to the central processing unit when a buffer data stream is read from the peripheral device interface controller to the data buffer.

6. The data synchronization method of claim 5, wherein the probe-hit-read signal further includes the corresponding addresses.

* * * * *